(No Model.) 3 Sheets—Sheet 1.

E. T. PRINDLE & F. C. BAIRD.
SASH LOCK.

No. 330,802. Patented Nov. 17, 1885.

WITNESSES
W. E. Aughinbaugh
C. W. Stetson

INVENTORS.
Edward T. Prindle
Frederick C. Baird
by John J. Halsted & Son
their Attys.

(No Model.) 3 Sheets—Sheet 2.

E. T. PRINDLE & F. C. BAIRD.
SASH LOCK.

No. 330,802. Patented Nov. 17, 1885.

Witnesses:
W. E. Aughinbaugh.
C. W. Stetson.

Inventors:
Edward T. Prindle
Frederick C. Baird
by John J. Halsted & Son
their Attys.

(No Model.) 3 Sheets—Sheet 3.

E. T. PRINDLE & F. C. BAIRD.
SASH LOCK.

No. 330,802. Patented Nov. 17, 1885.

WITNESSES:
W. E. Aughinbaugh
C. W. Stetson

INVENTORS:
Edward T. Prindle
Frederick C. Baird
by John J. Halsted & Son
their Attys.

N. PETERS, Photo-Lithographer, Washington, D. C.

UNITED STATES PATENT OFFICE.

EDWARD T. PRINDLE AND FREDERICK C. BAIRD, OF AURORA, ILLINOIS.

SASH-LOCK.

SPECIFICATION forming part of Letters Patent No. 330,802, dated November 17, 1885.

Application filed August 22, 1885. Serial No. 175,062. (No model.)

*To all whom it may concern:*

Be it known that we, EDWARD T. PRINDLE and FREDERICK C. BAIRD, both of Aurora, in the county of Kane and State of Illinois, have invented certain new and useful Improvements in Sash-Locks; and we do hereby declare that the following is a full, clear, and exact description of the invention, which will enable others skilled in the art to which it appertains to make and use the same, reference being had to the accompanying drawings, and to letters of reference marked thereon, which form a part of this specification.

This invention is a further improvement on the sash fastener or lock for which E. T. Prindle made application for a patent, and which was allowed on or about April 18, 1885, Serial No. 147,914; and it relates to the combination, with the lever-latches, of certain devices for operating the same, and which also positively lock them in either their fastening or unfastening position—that is, both when the latches are projected into the box or keeper on the upper sash, and also when they are withdrawn therefrom.

Figure 1:
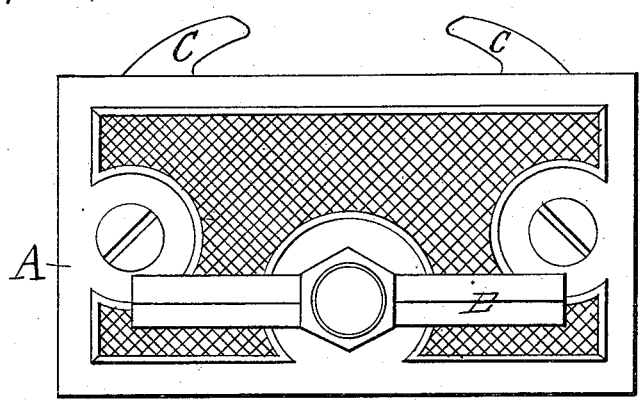
Figure 2:
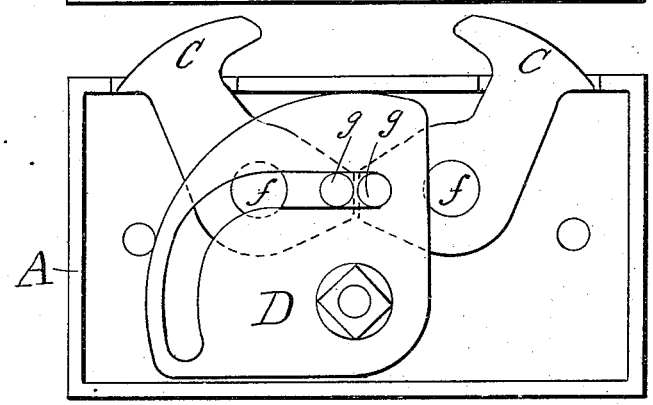
Figure 3:
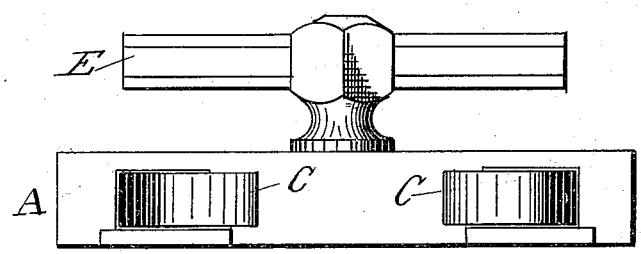
Figure 4:
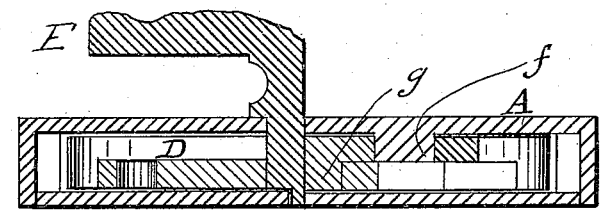
Figure 5:
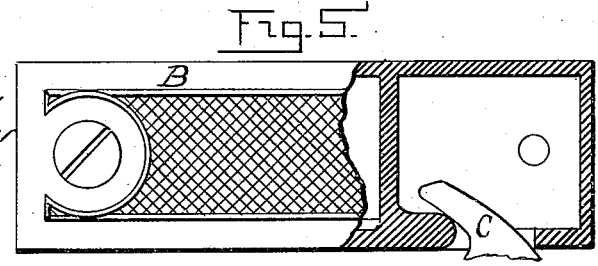
Figure 6:
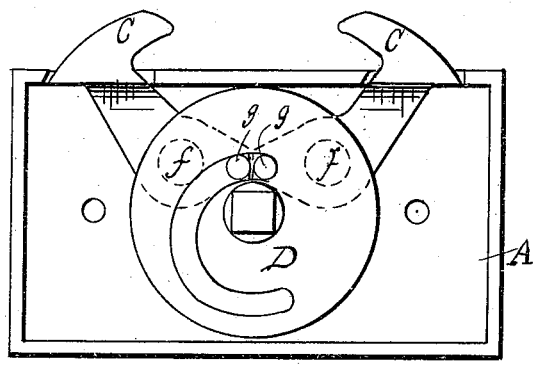
Figure 7:
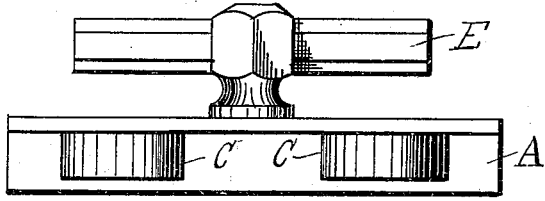
Figure 8:
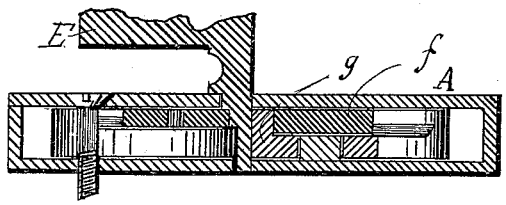
Figure 9:
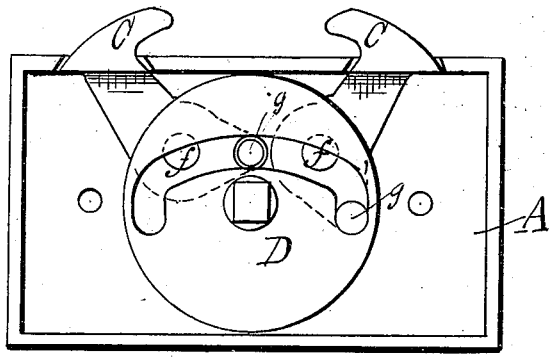
Figure 10:
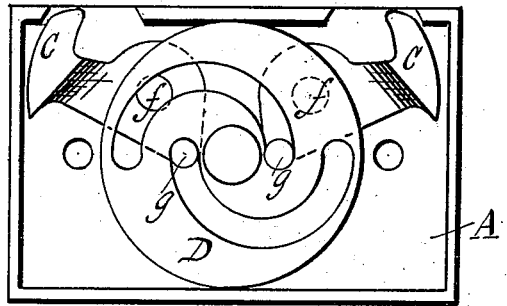
Figure 11:
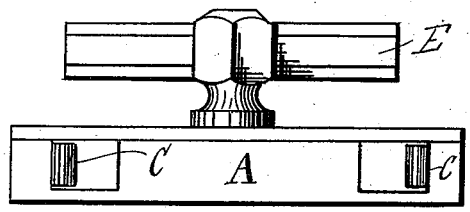
Figure 12:
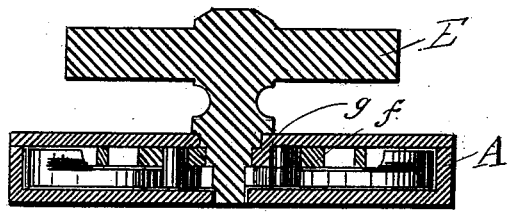

Figure 1 is a plan of a sash-lock embodying our invention; Fig. 2, an under side view with the bottom plate removed to show the locking mechanism; Fig. 3, a front elevation; Fig. 4, half-sections on the lines A B and C D, respectively, of Fig. 2; and Fig. 5, a plan, partly in section, of the box or keeper to be secured to the upper sash, and into which the levers of the lock, when it is secured on the lower sash, may be projected. Figs. 6, 7, 8 are respectively under side, plan, and section views of the same invention, but in which the slotted or cam plate is an entire disk instead of a segment or section of one. Fig. 9 shows a different form of slot in the disk, and in Figs. 10, 11, and 12 the cam-plate has two slots.

A is the case, adapted to be attached by screws to the lower sash of a window; B, the box or keeper for the upper sash, and these parts are shown in Figs. 1 and 5 in top view as they appear when applied for use. C C are the locking or latch levers; D, the cam-grooved plate which operates them; E, the handle connected to this plate for turning it on its pivot or pin. Each lever is arranged to swing on its post or pivot $f$, which may be made integral with the case, and has at or near its inner extremity a pin, $g$, adapted to run in a cam-groove, $h$, in the plate D, this groove being eccentric with reference to the center point around which the plate is turned by its handle E.

Referring more particularly to Figs. 1 to 9, it will now be seen that upon turning the handle—say to the right for about a quarter-turn—the groove acting on the pins $g$ of the levers causes these levers to turn on their posts or pivots $f$, and to force the pins farther away from the axis or center of motion of the plate D, and when this quarter-turn has been completed these pins will have described an arc of, say, forty-five degrees (45°) about the posts $f$, and this will of course cause the other or hooked ends of the levers to be swung inward and withdrawn entirely within the case.

The plate D, it will be observed, by the agency of its slot or slots positively locks the levers in either their locked or their unlocked position, and they cannot be moved, except by first operating the plate.

It will be evident that a difference in the position of the pins on the levers would need a corresponding change in the form of the groove, the principle and the results attained being the same as already described.

We claim—

1. In a sash-fastener, the combination, with a pair of lever-latches having pins or projections on their inner arms, of a grooved turn-plate directly engaging with such pins, as set forth, and serving, when turned, to operate the levers and to lock them to place.

2. In combination with the case and with the latch-levers pivoted therein and provided with pins $g$, the turn-plate, as formed with cam-grooves, serving to move the levers in opposite directions and to lock them in either their locked or their unlocked position, all substantially as set forth.

EDWARD T. PRINDLE.
FREDERICK C. BAIRD.

Witnesses:
M. O. SOUTHWORTH,
HERMAN C. BERRY.